United States Patent [19]

Assaf

[11] Patent Number: 4,869,070
[45] Date of Patent: * Sep. 26, 1989

[54] METHOD OF AND MEANS FOR CONTROLLING THE CONDITION OF AIR IN AN ENCLOSURE

[75] Inventor: Gad Assaf, Rehovot, Israel

[73] Assignee: Geophysical Engineering Company, Wilmington, Del.

[*] Notice: The portion of the term of this patent subsequent to Nov. 24, 2004 has been disclaimed.

[21] Appl. No.: 780,285

[22] Filed: Sep. 26, 1985

Related U.S. Application Data

[63] Continuation-in-part of Ser. No. 738,544, May 28, 1985, Pat. No. 4,707,995, which is a continuation of Ser. No. 377,368, May 12, 1982, abandoned.

[51] Int. Cl.$^4$ .............................................. F25D 17/06
[52] U.S. Cl. .......................................... 62/94; 62/271; 237/1 R; 237/81
[58] Field of Search ...................... 62/92, 93, 304, 271, 62/272, 275, 476, 311; 165/60

[56] References Cited

U.S. PATENT DOCUMENTS

| | | |
|---|---|---|
| 1,950,346 | 3/1934 | Williams et al. . |
| 2,690,656 | 10/1954 | Cummings . |
| 3,018,231 | 1/1962 | Valentine et al. . |
| 3,415,502 | 12/1968 | Munters . |
| 4,189,848 | 2/1980 | Ko et al. . |
| 4,287,721 | 9/1981 | Robison ................................ 62/271 |
| 4,355,683 | 10/1982 | Griffiths . |
| 4,707,995 | 11/1987 | Assaf ................................ 62/271 X |

FOREIGN PATENT DOCUMENTS

| | | |
|---|---|---|
| 0016470 | 10/1980 | European Pat. Off. . |
| 0123447 | 10/1984 | European Pat. Off. . |
| 0172598 | 2/1986 | European Pat. Off. . |
| 1421340 | 12/1968 | Fed. Rep. of Germany . |

*Primary Examiner*—Henry A. Bennet
*Attorney, Agent, or Firm*—Sandler & Greenblum

[57] ABSTRACT

Apparatus for conditioning the air in an enclosure utilizes a primary direct contact air/brine heat exchanger in which enclosure air is contacted with brine from a reservoir for condensing water vapor in the enclosure air onto the brine to form dilute brine. A brine concentrator is provided in the form of a secondary direct contact air/brine heat exchanger in which segregated air, separate from enclosure air, is contacted with heated dilute brine from the reservoir for evaporating water from the heated dilute brine into the segregated air to form concentrated brine. The secondary heat exchanger operates to heat the brine while it is being contacted with the segregated air.

64 Claims, 2 Drawing Sheets

METHOD OF AND MEANS FOR CONTROLLING THE CONDITION OF AIR IN AN ENCLOSURE

This application is a continuation-in-part of copending Application Ser. No. 738,544 filed May 28, 1985 (now U.S. Pat. No. 4,707,995) which is a continuation of Application Ser. No. 377,368 filed May 12, 1982 (now abandoned).

DESCRIPTION

1. TECHNICAL FIELD

This invention relates to a method of and means for conditioning air in an enclosure, and more particularly for controlling the temperature and humidity of air in an enclosure, such as a greenhouse.

2. BACKGROUND OF THE INVENTION

Agricultural products, such as vegetables and flowers, are grown on a large scale in greenhouses throughout the world. During daylight hours, growing agricultural products introduce water vapor into a greenhouse; and when the greenhouse is heated, some of the heat goes to evaporating water found in great quantities in a greenhouse. The water vapor thus produced adds to the water vapor produced by evapotranspiration of the growing products in the greenhouse with the result that the humidity in a greenhouse often approaches saturation. This is an unhealthy condition for most plants; and for many years, the conventional solution has been to open the greenhouse to ambient conditions for exchanging the air in the greenhouse with ambient air that is generally cooler and dryer. Because this solution is energetically inefficient, current efforts involve the application of direct contact air/brine heat exchangers to greenhouses for the purpose of drying the air. Brine is hygroscopic because the vapor pressure at the air/brine interface at a given temperature will be less than the vapor pressure of water vapor in the air at the same temperature.

One technique that might be applicable to greenhouses is disclosed in U.S. Pat. No. 4,355,683 which discloses passing air in an enclosure through a drying tower where the air is contacted with a brine shower causing water vapor in the air to condense on the brine droplets thereby drying the air and producing diluted brine that must be reconcentrated before being cycled back into the tower. In this patent, the latent heat of condensation added to the diluted brine during the conditioning process is rejected to the atmosphere in a heat exchanger, and is thus wasted.

More efficient use of the latent heat of condensation is found in the approach disclosed in co-pending U.S. Pat. Application Ser. No. 600,882, filed Apr. 16, 1984, the disclosure of which is hereby incorporated by reference. This application discloses apparatus for conditioning the air in a greenhouse utilizing a primary direct contact air/brine heat exchanger in which greenhouse air is contacted with brine from a reservoir for condensing water vapor in the air on the brine. The resultant diluted brine is reconcentrated using a second direct contact air/brine heat exchanger in which segregated air, separate from greenhouse air, is contacted with heated, dilute brine from the reservoir for evaporating water from the heated dilute brine into the segregated air to form concentrated brine. In order to heat the diluted brine, a segregated portion of the reservoir is provided with a heating coil connected to a boiler. The resultant heated diluted brine is pumped into a closed chamber overlying the segregated portion of the dilute brine establishing an air space that constitutes the segregated air. The warmed diluted brine falls in a film that is contacted by the segregated air which absorbs water vapor from the heated brine. The warmed and moist segregated air contacts the inner walls of the chamber whose exterior is cooled by brine from the primary reservoir. The result is that moisture in the warmed segregated air condenses on the inner surface of the chamber by reason of the transfer of heat through the walls of the chamber. The resultant condensate is removed and constitutes the moisture removed from the air in the greenhouse.

One of the problems with the device described above is the heating effect on the entire reservoir brine caused by heating the segregated portion of the reservoir. Thus, the brine that is contacted with the enclosure air is warmer than it should be; and, as a consequence, the overall efficiency of the system as a latent heat converter is reduced. That is to say, the warm brine applied to the enclosure air transfers sensible heat to the enclosure air, but at the same time, effects the transfer of water from the brine to the enclosure air, at least in the region where the brine initially contacts the enclosure air. This is detrimental because this increases the humidity in the air and requires a larger heat exchanger to counteract the additional vapor added to the air by the warmed brine.

Another problem arises because the brine that is concentrated is drawn from the segregated portion of the reservoir; and it is this portion that collects the brine after it is concentrated. Thus, the brine that is concentrated is not the least concentrated brine in the system; and as a result, more energy is required in the concentration process.

It is an object of the present invention to provide a new and improved method of and means for conditioning the air in an enclosure which does not suffer from the deficiencies of the prior art as described above.

BRIEF DESCRIPTION OF THE INVENTION

According to the present invention, apparatus for conditioning the air in an enclosure utilizes a primary direct contact air/brine heat exchanger in which enclosure air is contacted with brine from a primary reservoir for condensing water vapor in the enclosure air onto the brine to form a dilute brine. A brine concentrator, in the form of a secondary direct contact air/brine heat exchanger is provided, in which segregated air, separate from enclosure air, is contacted with heated dilute brine supplied directly from the primary reservoir for evaporating water from the heated dilute brine into the segregated air to form concentrated brine. Thus, the least concentrated brine in the system is supplied to the concentrator.

According to the present invention, means are associated with the second heat exchanger for heating the brine while it is contacted with the segregated air. Thus, according to the present invention, the dilute brine is heated simultaneously with the contacting of the brine with the segregated air rather than prior to its contact with the segregated air. This is advantageous because the brine is more efficiently concentrated.

The present invention also consists in the provision of means associated with the second heat exchanger for transferring heat from the concentrated brine to the dilute brine before the latter is contacted with the segregated air. In other words, most of the heat in the concentrated brine associated with the second heat exchanger is transferred to dilute brine before the latter is contacted with the segregated air so that the concentrated brine is cooled before it is used in the cycle that includes the primary direct contact air/brine heat exchanger. This preheating of the dilute brine before it is contacted with the segregated air further increases the efficiency of the system.

Because of the physical configuration of the secondary direct contact air/brine heat exchanger, a single motor may be employed driving a pair of fans, one of which exchanges enclosure air with the primary heat exchanger, and the other of which exchanges segregated air with the secondary heat exchanger. This feature also increases the efficiency of the system.

Finally, a droplet separator may be interposed between the primary heat exchanger and the enclosure for separating droplets of brine entrained in the enclosure air that is used for contacting the brine in the primary heat exchanger.

The invention also consists in the positioning of the primary direct contact air/brine heat exchanger at the inlet to an enclosure containing livestock, such as chickens, and the continuous operation of the heat exchanger. During daylight hours, the warm ambient air evaporates water vapor from the brine thus cooling and moistening the air entering the enclosure as the brine is concentrated. At night, when the ambient air temperature is lower, and the relative humidity is higher than during daylight hours, the brine absorbs water vapor from the air, and is warmed by the absorption of the latent heat of condensation of the water vapor. Some of the sensible heat of the warmed brine is transferred to the air entering the enclosure which is thus warmer and drier than ambient air. As a consequence, brine concentration is automatically carried out on a diurnal basis, and the air entering the enclosure is cooled and moistened during the day, and warmed and dried during the night, all to the benefit of the livestock in the enclosure.

BRIEF DESCRIPTION OF THE DRAWINGS

An embodiment of the present invention is disclosed in the accompanying drawings wherein.

DETAILED DESCRIPTION

Figure 1:
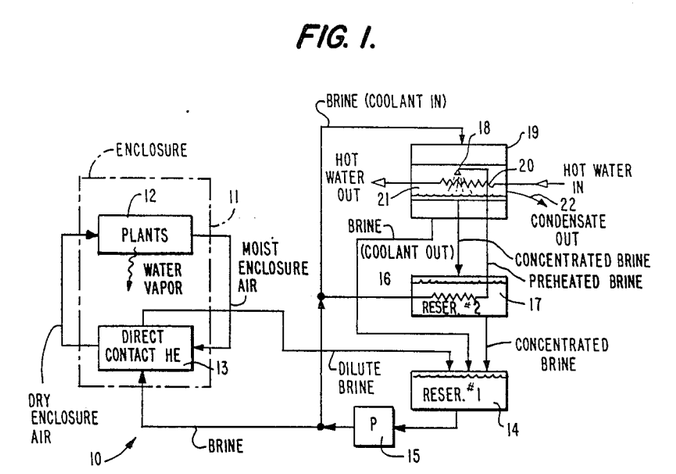
FIG. 1 is a block diagram representative of the present invention.

Referring now to the drawing, reference numeral 10 designates apparatus, in block diagram form, according to the present invention for conditioning the air in an enclosure such as greenhouse 11. Contained within greenhouse 11 are growing plants 12 which, during daylight hours produce water vapor that must be removed in order for the plants to remain healthy. In order to remove moisture from the air in the enclosure, primary direct contact air/brine heat exchanger 13 is utilized. Heat exchanger 13 is constructed and arranged so that air in the enclosure is continuously exchanged with the heat exchanger which causes a brine film, or spray, to directly contact the exchanged air. The brine concentration, at the temperature and pressure in the greenhouse, is such that the vapor pressure at the air/brine interface of the film or droplets will be less than the vapor pressure of water in the air with the result that the brine is hygroscopic. Consequently, moisture in the contacted air condenses on the brine film as droplets thus drying the contacted air and diluting the brine. A fan (not shown) circulates the dried air back to the enclosure, and the cycle repeats.

Operation of pump 15 effects the exchange of brine between primary reservoir 14 and primary heat exchanger 13. In order to maintain a steady state condition of the brine in reservoir 14, the water vapor added to the brine in heat exchanger 13 must be removed on a continuous basis. To this end, a brine concentrator is utilized. Brine from reservoir 14 is directly transferred by pump 15 to the brine concentrator through preheater coil 16, immersed in secondary brine reservoir 17, to spray head 18 in secondary direct air/brine heat exchanger 19. The transferred brine is sprayed by head 18 onto hot water coil 20 which is supplied with hot water from a heater (not shown), and which is located within closed chamber 21 such that the air in chamber 21 is segregated from air in enclosure 11.

The brine sprayed on coil 20 absorbs sensible heat from the coil; and the increased temperature results in an increase in the vapor pressure at the air/brine interface. As a result, the sprayed brine gives up water vapor to the segregated air within heat exchanger 19. The warmed, moisture laden segregated air is circulated within chamber 21; and, as a result, the moisture laden air contacts the walls of the chamber. The outer surface of these walls is cooled with brine from primary reservoir 14 delivered to the walls by pump 15. Consequently, moisture in the segregated air contacting the cooled walls of the chamber condenses on the inner surface. The resultant dried air is then recirculated into contact with the sprayed brine, and the cycle repeats.

The condensate formed on the inner walls of chamber 21 is removed at 22. This condensate represents the water removed from the air in enclosure 11 by the operation of primary heat exchanger 13. The coolant brine on the outer surface of chamber 21 absorbs the latent heat of condensation of the moisture that condenses on the inside of chamber 21, and a relatively small amount of sensible heat from the warm segregated air. The thus slightly warmed coolant brine is returned by gravity to primary reservoir 14.

The evaporation of water from the brine sprayed on coil 20 concentrates the sprayed brine which is cooled, somewhat, by the loss of the latent heat of vaporization, but the concentrated brine is still quite warm, and drips from the coil into secondary reservoir 17 which is segregated from primary reservoir. Most of the sensible heat in the newly concentrated brine is transferred to the dilute brine from primary reservoir 14 which is delivered to spray head 18 through preheater coil 16 with the result that the temperature of the concentrated brine delivered from reservoir 17 to reservoir 14 is substantially at the temperature of the brine in reservoir 14.

Several advantages result from the brine concentration process of the present invention as carried out by the structure described above. First, the process of the present invention ensures that the heat added to the brine to concentrate it is isolated from primary reservoir 14. As a result, the temperature of the brine supplied to heat exchanger 13 is not increased by reason of the concentration process. This means that the brine contacted by the air in the enclosure is not so warm, relative to the air in the enclosure, that it initially gives up water vapor to the air in the enclosure before becoming hygroscopic by being cooled by the air. This desirable result is achieved primarily because of preheater 16.

Second, the process of the present invention ensures an energetically efficient way in which to concentrate the brine because the most dilute brine in the system is concentrated. Moreover, the dilute brine is simultaneously heated and exposed to the segregated air rather than first being heated and then exposed to the air. By the simultaneous heating and exposure of the brine to the segregated air, the effectiveness of the evaporation process is uniform throughout the time the brine is exposed to segregated air. Were the brine first heated, and then exposed to segregated air, the evaporation process would become less effective as the brine cools.

Finally, the process of the present invention permits a single pump to be used both for exchanging brine between primary reservoir 14 and primary heat exchanger 13, and for exchanging brine between primary reservoir 14 and the brine concentrator. As a consequence, the process of the present invention is energetically efficient.

Figure 2:
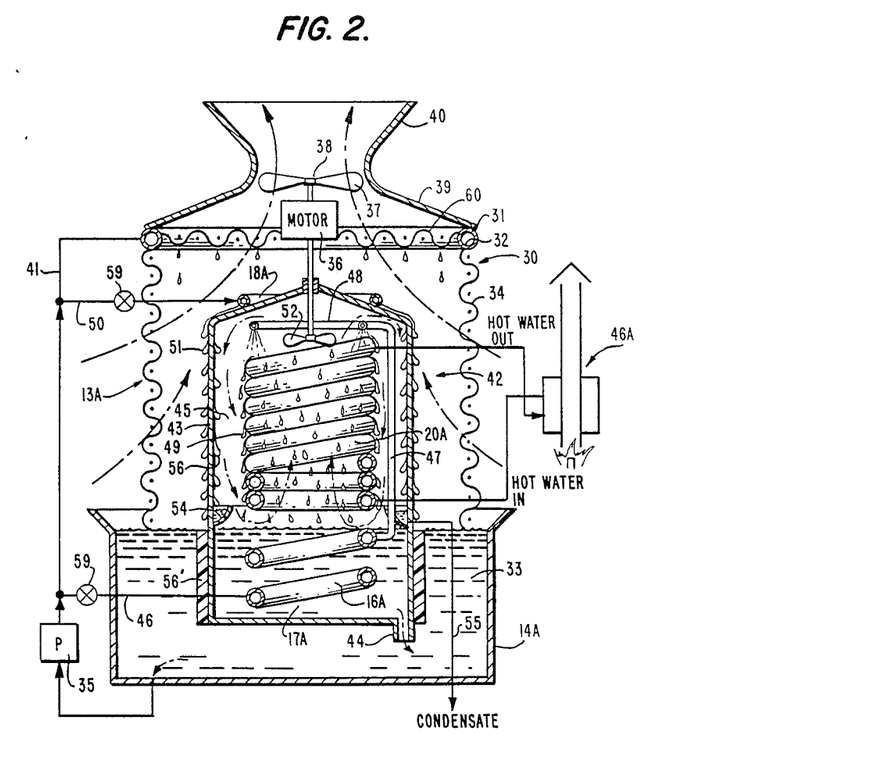
FIG. 2 is a sectional view of apparatus for conditioning air in an enclosure according to the present invention.

A specific embodiment for carrying out the process of the present invention is shown in FIG. 2 to which reference is now made. Apparatus 30 may be located with an enclosure (not shown) such as a greenhouse. It includes primary direct contact heat exchanger 13A in the form of header 31 that comprises a circular, horizontially disposed pipe having a plurality of small apertures 32 arranged around the lower portion of the pipe. The header is structurally supported above primary reservoir 14A which contains brine 33, such as calcium chloride at a concentration of about 30%. Suspended from the header is generally cylindrical porous sleeve 34 that may be in the form of a woven mat, or compressed fibrous material having a large surface area. Sleeve 34 thus may have almost no structural strength, and may be provided with a reenforcing cage (not shown) to maintain the sleeve in place in the face of air flow through the sleeve as described below.

Pump 35 delivers brine from reservoir 14A to header 31 via conduit 41; and the brine is metered from the header to sleeve 34 through apertures 32. As a consequence, a film of brine covers the material of the sleeve and flows downwardly thereover. Motor 36 powers fan 37 located in throat 38 of venturi 39 mounted on header 31 so that operation of the motor exchanges air between heat exchanger 13A and the interior of an enclosure. Specifically, fan 37 draws air from the enclosure through sleeve 34 into the throat of the venturi which, preferably, has diffuser 40 at its exit to make operation of the fan more efficient. As a consequence, enclosure air passes through the interstices of sleeve 34 contacting the brine film of the sleeve which serves to dry the air that exits through diffuser 40. To trap brine droplets entrained in the air drawn by fan 38 into the venturi, drift eliminator 60 may be employed. Drift eliminator 60 may be mounted on header 31 and located across the entrance of the venturi.

The brine on sleeve 34 slowly flows by gravity downwardly becoming more dilute as it approaches the bottom of the sleeve. Eventually, the dilute brine drips back into reservoir 14A. Pump 35 draws brine from the reservoir adjacent the bottom thereof in order to ensure that the most concentrated brine in the reservoir is supplied to the sleeve.

Pump 35 also delivers brine from reservoir 14A to brine concentrator 42 constructed in accordance with the present invention. Concentrator 42 includes vertical, metallic, tubular tank 43 closed at each axial end, except that the lower end of the tank is provided with opening means 44. Tank 43 is mounted so that its lower end is immersed in reservoir 14A, with the result that the tank is filled with brine to the level of the brine in reservoir 14A, the brine contained in tank 43 constituting secondary reservoir 17A, and being segregated therefrom. As a consequence, the tank defines chamber 45 above reservoir 17A within which air is trapped; and this air is separated, and is thus segregated, from the air in the enclosure.

Mounted within chamber 45 is hot water coil 20A in the form of a plurality of closely positioned helical turns of copper pipe that is supplied with hot water from water heater 46. Below coil 20A, and immersed in the brine in tank 43 is preheater coil 16A to which pump 35 delivers brine from reservoir 14A via conduit 46. After passing through coil 16A, the brine passes through conduit 47 to spray header 48 located above hot water coil 20A. Header 48 contains spray heads that meter brine over the outside surface of coil 20A, the falling brine (indicated schematically at 49) eventually dripping into reservoir 17A.

Pump 35 also delivers brine, via conduit 50 from reservoir 14A to header 18A located on top of tank 43. Thus, brine flows downwardly on the outer surface of tank 43 (as indicated schematically at 51) and eventually drips into reservoir 17A.

Figure 3:
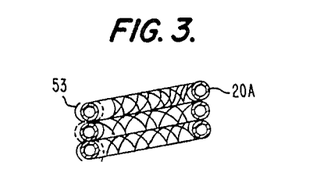
FIG. 3 is a partial view of the hot water coil shown in FIG. 2 illustrating an optional modification in which a net of hydrofilic fiber covers the coil.

Fan 52, located within chamber 45 inside and concentric with coil 20A, is attached to the same shaft as fan 37, and is driven by motor 36 to circulate segregated air in chamber 45. That is to say, fan 52 is effective to draw segregated air axially upwardly (or downwardly) through coil 20A into the head space at the top of tank 43 above the coil where the air then changes direction and spreads downwardly around the outside of the coil in the annular region surrounding the coil. The downwardly flowing air is drawn by fan 52 around the bottom peripheral edge of coil 20A which is spaced above the level of brine in reservoir 17A. To increase the time during which brine 49 contacts the segregated air, and to increase the surface area of the resultant brine film, coil 20A may be provided with a cover in the form of net 53 of hydrofilic fiber. The fibers of the net are woven around the coils as indicated in FIG. 3 so that the brine film is uniformly distributed on the outside and inside of the coil in order to maximize contact with the air.

Just above the brine level of reservoir 17A, tank 43 is provided with trough 54 to which drain 55 is attached. As explained below, this trough carries off the water removed from the air in the enclosure.

Finally, the lower portion of tank 43 may be thermally insulated as indicated at 56. This modification will assist in inhibiting the transfer of heat from reservoir 17A to reservoir 14A.

In operation, pump 35 and motor 36 are running, and hot water heater 46 supplies hot water to coil 20A. Fan 37 exchanges air between the enclosure and primary heat exchanger 13A; and the enclosure air, passing through sleeve 34, is contacted by brine from primary reservoir 14A flowing downwardly in a film on the sleeve. The enclosure air that exits through diffuser 40 is thus dried; and the brine that drips from the sleeve back into the reservoir is diluted by its absorption of water vapor from the enclosure air.

The brine from reservoir 14A delivered by pump 35 to preheater 16A is heated by the brine in secondary reservoir 17A, and then sprayed over hot water coil 20A as the segregated air in chamber 45 contacts the brine. The brine is heated as a consequence, and gives up water vapor to the segregated air which becomes warmer and moist. The warm and moist segregated air is circulated into contact with the metallic walls of tank 43 which are cooled by the flow of brine 51 on the outer surface. The water vapor carried by the air condenses into droplets 56 on the relatively cool, inner surface of the tank, and flows downwardly into trough 54 from which it is drained via conduit 55.

Brine droplets 49, on the surface of hot water coil 20A, becomes increasingly concentrated as the droplets flows downwardly over the coil, eventually dripping into reservoir 17A. The heated and more concentrated brine in reservoir 17A gives back some of its sensible heat to the brine being delivered to spray head 48 by the operation of preheater 16A. Thus, the concentrated brine that flows downwardly through opening means 44 into reservoir 14A is cooled to substantially the temperature of the brine in reservoir 14A. In this manner, the brine delivered to header 31 and thence to sleeve 34 will be relatively cool and thus hygroscopic with respect to the air in the enclosure.

In latitudes where the weather is cold in the winter, the invention may be used as follows: during the day, the air in the greenhouse will be relatively cold and moist; and only primary heat exchanger 13A is operated. To this end, selectively operable valves 59 associated with conduits 46 and 50 of the secondary heat exchanger are closed. The brine contacted by the air absorbs moisture from the air, the latent heat of condensation increasing the sensible heat of the brine. Some of this sensible heat is transferred to the air thus warming the air. This process is carried out under conditions of constant enthalpy.

During the night, the temperature of the air in the enclosure drops, but the plants become quiescent and produce no moisture. Heat is now added to the air in the greenhouse, either manually or automatically, and the brine concentrator of the present invention is activated by opening valves 59 and operating water heater 46A. Due to the design of the present invention, the heat used to regenerate the brine eventually is returned to the air in the enclosure.

The invention is also applicable to conditioning the air in an enclosure designed to accomodate livestock whose environmental conditions are carefully controlled to maximize production of food for human consumption. Poultry is an example of livestock raised under controlled conditions. If the poultry enclosure is not ventilated, the humidity and/or temperature will often reach levels that are uncomfortable to those working within the enclosure, and detrimental to the poultry because the environmental conditions are conducive to producing lung diseases in the poultry; and this situations adversely affects the quality of poultry products.

The conventional approach to this problem is forced ventilation of the enclosure such that the interior air is continuously replaced with ambient air. The relatively high rates of air flow required for ventilation purposes markedly increase the level of dust and dirt inside the enclosure; and this factor is also conducive to the development of serious diseases by the poultry. This problem is solved by the present invention in the manner shown in FIG. 4.

Figure 4:
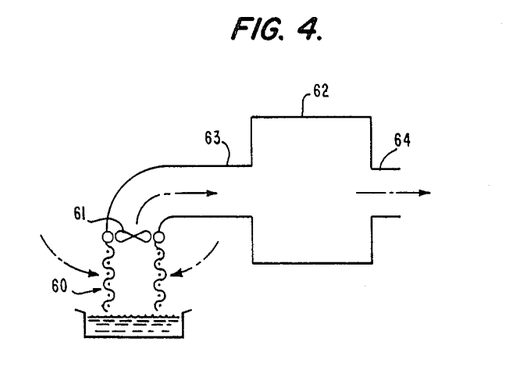
FIG. 4 is a schematic diagram of the application of the invention to condition the air in an enclosure containing livestock.

Referring to FIG. 4, primary direct contact air/brine heat exchanger 60 is positioned upstream of ventilator 61 that inputs ambient air to poultry enclosure 62 via duct 63. Interior air from the enclosure exits through outlet duct 64. Heat exchanger 60 is constructed like heat exchanger 13A (FIG. 1); but no secondary heat exchanger is necessary to concentrate the brine used in the primary heat exchanger because concentration is carried out on a diurnal basis by reason of the constant operation of the primary heat exchanger.

In operation during the day, warm and relatively dry ambient air will contact the brine in heat exchanger 60 causing water to be evaporated from the brine thus concentrating the brine. The humidity of the air drawn into the enclosure will increase by reason of the water absorbed from the brine, and the air will also be cooled because it supplies the latent heat of evaporation to the brine. The cooler and more moist air is more healthy than the warmer drier ambient air. The exchange of heat between the brine and the air occurs under conditions of constant enthalpy, and the wet bulb temperature of the air remains constant.

At night, when the ambient air temperature drops, the relative humidity of the air is greater than during the day. Now, the colder wetter night air renders the brine hygroscopic and the brine absorbs water vapor from the air entering the enclosure. In addition, the latent heat of condensation released by the condensation warms the air. Thus the air entering the enclosure is warmer and drier than the ambient night air; and this is a healthier condition for the poultry. The exchange of heat between the brine and air at night is also carried out under conditions of constant enthalpy. In addition to solving the problem of dust and dirt in the air in livestock enclosures, the present invention provides a cleansing of the air that amounts to sterilization. For livestock enclosures, this cleansing of the air significantly reduces respiratory illnesses. For greenhouses, the cleansing of the air provided by the present invention reduces the need for sprays and pesticides for the plants growing in the greenhouse.

The advantages and improved results achieved by the method and apparatus of the present invention are apparent from the foregoing description of the preferred embodiment of the invention. Various changes and modifications may be made without departing from the spirit and scope of the invention as described in the appended claims.

I claim:

1. Apparatus for conditioning the air in an enclosure utilizing a primary direct contact air/brine heat exchanger in which enclosure air is contacted with brine from a primary reservoir for condensing water vapor in the enclosure air onto the brine to form dilute brine, and including a brine concentrator in the form of a secondary direct contact air/brine heat exchanger in which segregated air, separate from enclosure air, is contacted with heated dilute brine for evaporating water from the heated dilute brine into the segregated air to form water vapor and concentrated brine, the improvement comprising: heater means associated with said secondary heat exchanger for heating the brine while it is being contacted with the segregated air which is substantially separate from both enclosure and ambient air, and condensing means associated with said second heat exchanger for receiving said water vapor and producing condensate, said condensing means being in heat exchange relationship with the brine in said primary reservoir.

2. Apparatus according to claim 1 including means associated with said secondary heat exchanger for transferring heat from the concentrated brine to the dilute brine before the latter is contacted with the segregated air.

3. Apparatus according to claim 2 including a single motor for driving a pair of fans, one of which causes enclosure air to be exchanged with the primary heat exchanger, and the other of which causes segregated air to be exchanged with said secondary heat exchanger.

4. Apparatus according to claim 2 including a drop separator interposed between the primary heat exchanger and the enclosure for separating droplets of brine entrained with the enclosure air.

5. Apparatus for conditioning the air in an enclosure comprising:
(a) a primary direct contact air/brine heat exchanger;
(b) a primary brine reservoir;
(c) a pump whose input is connected to the primary reservoir for exchanging brine with said primary heat exchanger;
(d) a primary fan exchanging air in the enclosure with the heat exchanger so that enclosure is contacted with brine from the primary reservoir whereby water vapor in the contacted enclosure air condenses on the contacted brine thereby drying the air and diluting the brine;
(e) a second direct contact air/brine heat exchanger containing segregated air, substantially separate from both enclosure and ambient air;
(f) said secondary heat exchanger having heat exchange means for contacting dilute brine produced by said primary heat exchanger with segregated air of said secondary heat exchanger, and simultaneously heating the contacted dilute brine whereby water vapor therein is evaporated into the segregated air thereby concentrating the contacted brine and moistening the contacted segregated air; and
(g) connection means constructed and arranged so that said pump also delivers brine from said reservoir to said second heat exchanger.

6. Apparatus according to claim 5 wherein said heat exchange means includes a coil containing hot water, and said pump delivers brine from said primary reservoir to the exterior of said coil where the diluted brine is simultaneously heated and contacted by said segregated air.

7. Apparatus for conditioning the air in an enclosure comprising:
(a) a primary direct contact air/brine heat exchanger;
(b) a primary brine reservoir;
(c) a pump whose input is connected to the primary reservoir for exchanging brine with said primary heat exchanger;
(d) a primary fan exchanging air in the enclosure with the heat exchanger so that enclosure is contacted with brine from the primary reservoir whereby water vapor in the contacted enclosure air condenses on the contacted brine thereby drying the air and diluting the brine;
(e) a second direct contact air/brine heat exchanger containing segregated air, substantially separate from both enclosure and ambient air;
(f) said secondary heat exchanger having heat exchange means for contacting dilute brine produced by said primary heat exchanger with segregated air of said secondary heat exchanger, and simultaneously heating the contacted dilute brine whereby water vapor therein is evaporated into the segregated air thereby concentrating the contacted brine and moistening the contacted segregated air;
(g) said heat exchange means including a coil containing hot water, and said pump delivers brine from said primary reservoir to the exterior of said coil where the diluted brine is simultaneously heated and contacted by said segregated air;
(h) a secondary reservoir for collecting brine dripping from said coil; and
(i) a preheater immersed in said secondary reservoir for receiving dilute brine from said pump before the dilute brine is delivered to the exterior of said coil.

8. Apparatus according to claim 7 including a secondary fan for contacting segregated air in the secondary heat exchanger with dilute brine therein.

9. Apparatus according to claim 8 wherein the first and second fans are driven from a common motor.

10. Apparatus according to claim 8 including a droplet separator for trapping entrained droplets in the enclosure air.

11. Apparatus according to claim 8 including a hydrofilic film net on said coil.

12. Apparatus according to claim 8 including insulation means for insulating said second reservoir against heat loss.

13. Apparatus for conditioning the air in an enclosure comprising:
(a) a primary direct contact air/brine heat exchanger;
(b) a primary brine reservoir;
(c) a pump whose input is connected to the primary reservoir for exchanging brine with said primary heat exchanger;
(d) a primary fan exchanging air in the enclosure with the heat exchanger so that enclosure is contacted with brine from the primary reservoir whereby water vapor in the contacted enclosure air condenses on the contacted brine thereby driving the air and diluting the brine; and
(e) a second direct contact air/brine heat exchanger containing segregated air, substantially separate from both enclosure and ambient air;
(f) said secondary heat exchanger having heat exchange means for contacting dilute brine produced by said primary heat exchanger with segregated air of said secondary heat exchanger, and simultaneously heating the contacted dilute brine whereby water vapor therein is evaporated into the segregated air thereby concentrating the contacted brine and moistening the contacted segregated air; and
(g) wherein the secondary heat exchanger comprises a chamber whose lower portion is immersed in the primary reservoir and has an opening for connecting the interior of the chamber to the primary reservoir so that the chamber is partially filled with brine defining a secondary reservoir, the space in said chamber above the brine therein containing air that is segregated from the air in the enclosure.

14. Apparatus according to claim 13 wherein said heat exchange means includes a coil for receiving hot water, said coil being positioned within said chamber in heat exchange contact with the segregated air therein, and means for delivering brine from said pump to the outer surface of said coil.

15. Apparatus according to claim 14 including a preheater immersed in the brine in said chamber for receiving brine from said pump before the brine is delivered to the outer surface of said coil.

16. Apparatus according to claim 15 wherein said coil is covered with a hydrofilic fiber net.

17. Apparatus according to claim 15 including means for delivering brine from said pump to the outer surface of said chamber to cool the same.

18. Apparatus according to claim 17 including trough means inside said chamber to trap condensate on the inside walls of the chamber.

19. Apparatus according to claim 17 including means for thermally insulating the lower portion of said chamber.

20. Apparatus for conditioning the air in an enclosure comprising:
   (a) a primary direct contact air/brine heat exchanger;
   (b) a primary brine reservoir;
   (c) a pump whose input is connected to the primary reservoir for exchanging brine with said primary heat exchanger;
   (d) a primary fan exchanging air in the enclosure with the heat exchanger so that enclosure is contacted with brine from the primary reservoir whereby water vapor in the contacted enclosure air condenses on the contacted brine thereby drying the air and diluting the brine; and
   (e) a second direct contact air/brine heat exchanger containing segregated air, substantially separate from both enclosure and ambient air;
   (f) said secondary heat exchanger having heat exchange means for contacting dilute brine produced by said primary heat exchanger with segregated air of said secondary heat exchanger, and simultaneously heating the contacted dilute brine whereby water vapor therein is evaporated into the segregated air thereby concentrating the contacted brine and moistening the contacted segregated air;
   (g) a secondary reservoir for collecting brine concentrated by said secondary heat exchanger; and
   (h) a preheater responsive to brine in said secondary reservoir for transferring heat therefrom to dilute brine before it is contacted with said segregated air.

21. Apparatus for conditioning the air in an enclosure comprising:
   (a) a primary reservoir for containing concentrated brine;
   (b) a porous sleeve exposed to air in said enclosure and positioned above the primary reservoir, and having spray means located above said sleeve;
   (c) means to pump brine from said primary reservoir to said spray means for effecting the downward flow of brine on said sleeve before the downwardly flowing brine is returned to said primary reservoir;
   (d) a closed tank located within said sleeve for establishing a chamber containing air that is segregated from the air in said enclosure; and
   (e) regeneration means to simultaneously heat and contact brine from said primary reservoir with the segregated air in said chamber for evaporating water from the contacted brine thereby concentrating the same.

22. Apparatus according to claim 21 wherein said regeneration means comprises:
   (a) a closed heat exchanger having two separate sides and located in said chamber;
   (b) means to furnish heated fluid to one side of said closed heat exchanger; and
   (c) means to furnish brine from said primary reservoir to the other side of said closed heat exchanger.

23. Apparatus according to claim 22 wherein said closed heat exchanger is constituted by a metal coil through which hot water is pumped.

24. Apparatus according to claim 23 including spray head means located in said chamber above said closed heat exchanger, and means to supply brine from said first primary reservoir to the outside of the metal coil.

25. Apparatus according to claim 24 including a second reservoir associated with said closed tank, and wherein said closed tank has an opening that effects a connection between the brine in the second reservoir and the brine in the primary reservoir.

26. Apparatus according to claim 25 including a preheater immersed in the second reservoir, and means for passing the brine from said primary reservoir to said spray heads through said preheater.

27. Apparatus according to claim 26 including means for applying brine from said primary reservoir to the exterior of said tank.

28. Apparatus according to claim 27 wherein the means for applying brine to the exterior of said tank includes a header located above said tank, and containing orifices for metering brine to the outer surface of said tank.

29. Apparatus according to claim 28 wherein said spray head means include a spray header located above said sleeve and containing orifices for metering brine to said porous sleeve.

30. Apparatus according to claim 29 including a pump for pumping brine from said primary reservoir simultaneously to said preheater, and to the headers located above the tank and above the porous sleeve.

31. Apparatus according to claim 23 wherein said metal coil is covered with fabric.

32. Apparatus according to claim 30 including fan means for circulating air in said tank.

33. Apparatus according to claim 32 including fan means associated with said porous sleeve for effecting the passage of air through said porous sleeve and over the outer surface of said tank.

34. Apparatus according to claim 33 including a motor for driving both said fan means.

35. Apparatus according to claim 34 including a venturi operatively associated with said second fan means.

36. Apparatus according to claim 33 including a venturi operatively associated with said second fan means.

37. Apparatus according to claim 17 including a droplet separator for trapping droplets entrained in the enclosure air.

38. Apparatus according to claim 37 wherein said droplet separator is positioned in the vicinity of the outer surface of said droplet chamber.

39. Apparatus according to claim 33 including a droplet separator for trapping droplets entrained in said enclosure air.

40. Apparatus according to claim 39 wherein said droplet separator is positioned in the vicinity of the outer surface of said droplet chamber.

41. Apparatus according to claim 22 wherein said closed heat exchanger is constituted by a plastic coil through which hot water is pumped.

42. Apparatus according to claim 22 wherein said closed heat exchanger is constituted by a metallic coil through which hot water is pumped.

43. Apparatus according to claim 22 wherein said closed heat exchanger is constituted by a copper coil through which hot water is pumped.

44. Apparatus according to claim 26 wherein said preheater is constituted by a plastic coil through which brine from the primary reservoir passes.

45. Apparatus according to claim 26 wherein said preheater is constituted by a metallic coil through which brine from the primary reservoir passes.

46. Apparatus according to claim 26 wherein said preheater is constituted by a copper coil through which brine from the primary reservoir passes.

47. Apparatus according to claim 26 wherein said preheater is constituted by a titanium coil through which brine from the primary reservoir passes.

48. Apparatus according to claim 1 wherein said heater means includes a closed coil located in said segregated air, and a heater for supplying hot water to said coil, and including dilute brine applicator means for causing dilute brine to flow over said coil as a thin film.

49. Apparatus according to claim 48 wherein said dilute brine applicator means is constructed and arranged to spray dilute brine on said coil.

50. Apparatus according to claim 48 wherein said condensing means includes a surface in contact with the segregated air, and a surface in contact with the brine in said primary reservoir.

51. Apparatus according to claim 50 wherein concentrated brine applicator means are provided for causing concentrated brine from said primary reservoir to flow as a thin film over said surface in contact with said segregated air.

52. Apparatus according to claim 48 wherein said dilute brine applicator means includes a preheater for heating said dilute brine before it flows over said coil.

53. Apparatus according to claim 52 including a second reservoir of concentrated brine for collecting brine that flows over said coil.

54. Apparatus according to claim 53 wherein said preheater includes a coil in heat exchange contact with the brine in said second reservoir, said dilute brine applicator means being constructed and arranged to pass dilute brine from said primary reservoir through said preheater coil before the dilute brine flows over said coil.

55. Apparatus comprising:

(a) a vented enclosure located in an environment where ambient air, during the day is relatively hot and dry, and during the night is relatively cool and moist;
(b) ventilator means for continuously supplying ambient air to said enclosure, day and night; and
(c) a direct contact air/brine heat exchanger including a reservoir of brine, and means for continuously contacting brine from said reservoir with ambient air supplied to said enclosure by said ventilator means.

56. Apparatus according to claim 55 wherein said enclosure contains livestock.

57. Apparatus according to claim 55 wherein said enclosure contains plants.

58. A method for conditioning the air in an enclosure located in an environment where ambient air during the day is relatively hot and dry, and during the night is relatively cool and moist, said method comprising the steps of:

(a) venting said enclosure;
(b) supplying ambient air to said enclosure day and night through a direct contact air/brine heat exchanger such that during the day, the relatively hot and dry air supplied to said enclosure is first cooled and moistened by contact with the brine in the heat exchanger such that the brine is warmed and concentrated as a result, and during the night, the relatively cool and moist air supplied to the enclosure is first heated and dried by contact with the brine in the heat exchanger such that the brine is diluted and cooled.

59. Apparatus according to claim 58 wherein the method is applied to an enclosure containing livestock.

60. Apparatus according to claim 58 wherein the method is applied to an enclosure containing plants.

61. An apparatus according to claim 22 wherein said closed heat exchanger is constituted by a copper/tin alloy coil through which the hot water is pumped.

62. An apparatus according to claim 22 wherein said closed heat exchanger is constituted by a copper/zinc alloy coil through which the hot water is pumped.

63. An apparatus according to claim 26 wherein said preheater is constituted by a copper/tin alloy coil through which brine from the primary reservoir passes.

64. An apparatus according to claim 26 wherein said preheater is constituted by a copper/zinc alloy coil through which brine from the primary reservoir passes.

* * * * *

UNITED STATES PATENT AND TRADEMARK OFFICE
CERTIFICATE OF CORRECTION

PATENT NO. : 4,869,070

DATED : September 26, 1989

INVENTOR(S) : G. ASSAF

It is certified that error appears in the above-identified patent and that said Letters Patent is hereby corrected as shown below:

```
Column  9, line 27, after "enclosure" insert ---air---.
Column  9, line 36, change "secondary" to ---second---.
Column  9, line 61, after "enclosure" insert ---air---.
Column 10, line  1, change "secondary" to ---second---.
Column 10, line 41, after "enclosure" insert ---air---.
Column 10, line 49, change "secondary" to ---second---.
Column 10, line 57, change "secondary" to ---second---.
Column 11, line 26, after "enclosure" insert ---air---.
Column 11, line 34, change "secondary" to ---second---.
Column 11, line 43, change "secondary" to ---second---.
Column 12, line 59, delete "droplet".
Column 12, line 65, delete "droplet".
```

Signed and Sealed this

Twenty-fourth Day of November, 1992

Attest:

DOUGLAS B. COMER

Attesting Officer

Acting Commissioner of Patents and Trademarks